Patented Oct. 30, 1951

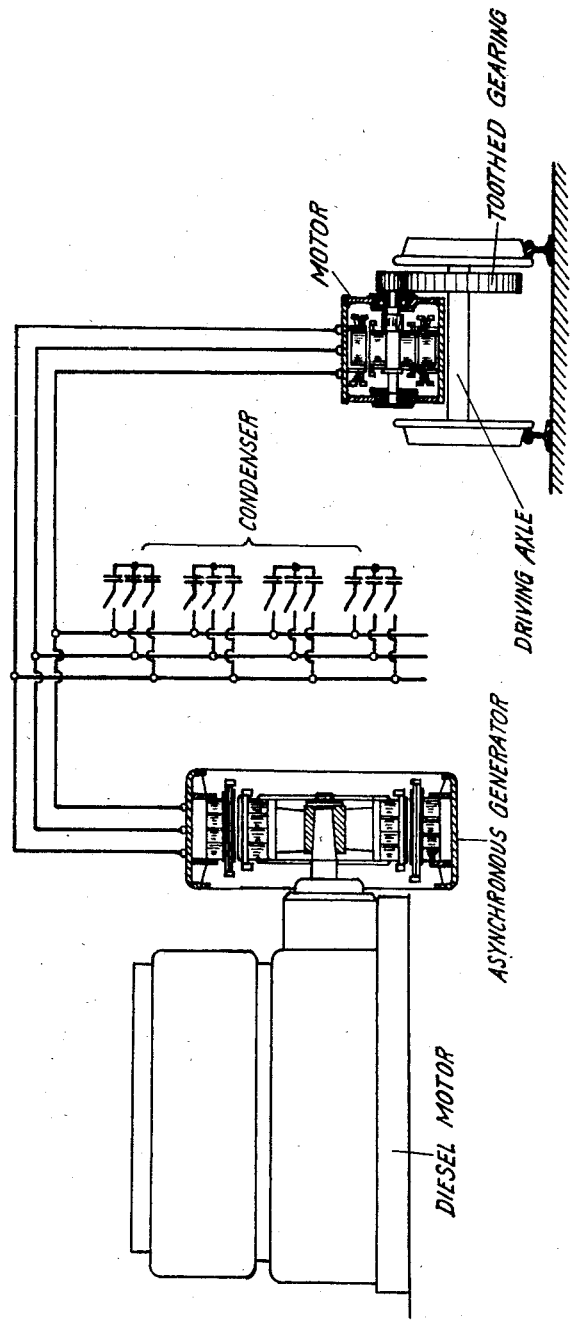

2,573,071

UNITED STATES PATENT OFFICE 2,573,071

POWER TRANSMISSION SYSTEM, ESPECIALLY FOR VEHICLES

Bjarne Storsand, Zurich, Switzerland, assignor to Maschinenfabrik Oerlikon, Zurich-Oerlikon, Switzerland Application August 26, 1948, Serial No. 46,223
In Switzerland August 29, 1947

1 Claim. (Cl. 318—148)

This invention relates to a power transmission system, especially for vehicles.

It is known to use condenser-excited, pole-reversible asynchronous generators in conjunction with pole-reversible three-phase motors for the transmission of power in vehicles having a thermal drive or flywheel energy accumulators.

Although the use of short circuit armatures in generators was known, such use was however impossible in motors on account of the great starting current and the subsequent impulse. This starting impulse, can be avoided by the use of a starter transformer with a step-by-step switch, but this involves more expense and complication of the equipment as well as an increase of weight, which is undesirable for vehicles.

The attached drawing is a self explanatory diagram showing one form of the invention.

According to the present invention the wattless energy of the short-circuit armature motor is compensated, before the asynchronous generator commences to deliver energy, by means of condensers in such a way that the voltage, even when switching-in the slightly excited asynchronous generator, does not break down and a gradual impulse-free high regulation of the voltage by means of condensers is rendered possible.

This can be effected in practice either by compensating the wattless energy of the short-circuit armature motor before its connection to the already excited asynchronous generator, or, what is generally preferable, the short-circuit armature motor can be connected to the unexcited asynchronous generator, with the further connection of condensers until the group is self-excited. This is facilitated if:

The motors have armatures with such high resistance at the moment of starting, that the motor operates near the turn over point, i. e., that the starting moment from standstill corresponds approximately to the maximum moment of the motor. This condition is fulfilled by twin cage armatures and eddy current rotors without too great a loss in efficiency.

In accordance with the present invention the squirrel cage asynchronous motor and the asynchronous generator are electrically connected with each other when both are not excited and when the prime mover, for instance the diesel motor drives the asynchronous generator there are gradually connected a number of condensers into the circuit connecting the generator and the asynchronous motor until the two electrical machines become self-exciting and the motor is able to operate to drive the traction wheel. The start of the vehicle takes place without shock as soon as the inductive blind power of the generator-motor group is compensated by the capacitative blind power of the condensers and as soon as additional condensers are connected in the circuit which initiate the excitation of the generator. In this manner the voltage is gradually increased and results in an increase of the starting power of the motor.

The selection of short-circuit armature motors for the drive, renders it possible to use pole-reversible motors which in combination with the pole-reversible generator gives a good series of starting steps. Thus, for example 2-4-8 poles on the generator and 6-8-10 poles on the motor give nine uniformly distributed driving steps.

The present invention solves the problem of the transmission of energy with variable number of revolutions for vehicles, using short-circuit armature machines of greatest simplicity and economy and without the aid of slip rings, collectors and the like.

Having now particularly described and ascertained the nature of my said invention and in what manner the same is to be performed, I declare that what I claim is:

A power transmission system, particularly for street and rail vehicles, comprising an asynchronous generator, a prime mover for driving said generator, a squirrel cage asynchronous motor for driving the vehicle, first means electrically connecting said generator and said motor, a plurality of condensers, second means electrically connecting said condensers selectively in parallel with said motor, said motor and generator being connected by said first means with each other in non-excited condition, said condensers being adapted when selectively connected said motor and generator thereby rendering said by said second means to cause self-excitation of motor operative to drive the vehicle.

BJARNE STORSAND.

REFERENCES CITED

The following references are of record in the file of this patent:

UNITED STATES PATENTS

| Number | Name | Date |
|---|---|---|
| 615,954 | Bradley | Dec. 13, 1898 |
| 715,545 | Bradley | Dec. 9, 1902 |
| 910,638 | Bradley | Jan. 26, 1909 |
| 1,598,268 | De Coninck | Aug. 31, 1926 |
| 1,676,312 | Alexanderson | July 10, 1928 |
| 2,189,353 | Steinbauer et al. | Feb. 6, 1940 |